United States Patent
Watanabe

[11] Patent Number: 6,076,041
[45] Date of Patent: Jun. 13, 2000

[54] LAND VEHICLE NAVIGATION APPARATUS WITH GUIDANCE DISPLAY IMAGE LIMITER FOR RECOGNIZABILITY ENHANCEMENT

[75] Inventor: Kazuyuki Watanabe, Anjo, Japan

[73] Assignee: Aisin Aw Co., Ltd., Japan

[21] Appl. No.: 08/920,881

[22] Filed: Aug. 29, 1997

[30] Foreign Application Priority Data

Aug. 30, 1996 [JP] Japan ................................. 8-230301

[51] Int. Cl.$^7$ ........................... G06G 7/78; G06F 165/00
[52] U.S. Cl. ...................... 701/211; 701/207; 701/208; 701/209; 701/200; 701/202; 340/988; 340/990; 340/995
[58] Field of Search .................................. 701/200, 207, 701/208, 209, 211, 202; 340/988, 990, 995

[56] References Cited

U.S. PATENT DOCUMENTS

| | | | |
|---|---|---|---|
| 5,220,507 | 6/1993 | Kirson | 364/444 |
| 5,272,638 | 12/1993 | Martin et al. | 364/444 |
| 5,402,120 | 3/1995 | Fujii et al. | 701/209 |
| 5,486,822 | 1/1996 | Tenmolu et al. | 340/995 |
| 5,587,911 | 12/1996 | Asano et al. | 364/444.2 |
| 5,689,423 | 11/1997 | Sawada | 364/444.2 |
| 5,748,109 | 5/1998 | Kosaka et al. | 340/995 |
| 5,815,824 | 9/1998 | Saga et al. | 701/22 |
| 5,832,406 | 11/1998 | Iwami et al. | 701/202 |
| 5,893,045 | 4/1999 | Kusama et al. | 701/211 |

*Primary Examiner*—William A. Cuchlinski, Jr.
*Assistant Examiner*—Olga Hernandez
*Attorney, Agent, or Firm*—Lorusso & Loud

[57] ABSTRACT

Land vehicle navigation apparatus for searching for a route to a destination and for providing guidance improves readability of intersection diagrams to thereby enable a vehicle operator to more easily recognize the travel path at a guidance intersection. The apparatus includes a storage device for storage of data representative of intersection diagrams and other data for use in performing route guidance. A display control device controls display of an intersection diagram by identifying that information necessary for route guidance from among the stored data items and depicts only that information so identified, i.e. the truly necessary information items. A present position detector detects the present vehicle location and the display controller causes the intersection diagram to be displayed responsive to an intersection display instruction automatically issued when the detected present vehicle position approaches to within a predefined distance from the guidance intersection.

13 Claims, 8 Drawing Sheets

FIG. 3(A)

PRESENCE/ABSENCE OF INFORMATION
PRESENT: O

ROAD ATTRIBUTE DATA

| ELEVATED TRACK/SUBWAY ROAD DATA | ELEVATED TRACK | |
|---|---|---|
| | BESIDE ELEVATED TRACK | |
| | SUBWAY ROAD | O |
| | BESIDE SUBWAY ROAD | |
| LANE NO. | 3 LANES OR MORE | |
| | 2 LANES | O |
| | 1 LANE | |
| | NO CENTERLINE | |

FIG. 3(B)

ROAD NAME DATA

| ROAD TYPE | SUBTYPE NO. |
|---|---|

| | | |
|---|---|---|
| HIGHWAY | MAIN | 1 |
| | ACCESS | 2 |
| CITY SPEEDWAY | MAIN | 3 |
| | ACCESS | 4 |
| TOLL ROAD | MAIN | 5 |
| | ACCESS | 6 |
| PUBLIC ROAD { NATIONAL ROAD | | 7 |
| STATE OR PREFECTURAL ROAD | | 8 |
| OTHERS | | 9 |

CAUTION DATA

| RAILROAD CROSSING | O |
|---|---|
| TUNNEL ENTRANCE | |
| TUNNEL EXIT | |
| LANE MERGE POINT | |
| NONE | |

GUIDANCE DATA

| NEAR RIGHT | |
|---|---|
| NEAR LEFT | |
| NEAR CENTER | O |
| NONE | |

LAND VEHICLE NAVIGATION APPARATUS WITH GUIDANCE DISPLAY IMAGE LIMITER FOR RECOGNIZABILITY ENHANCEMENT

BACKGROUND OF THE INVENTION

1. Field of the Invention

The present invention relates generally to mobile electronics and, more particularly, to vehicle navigation systems for searching for a route to a destination and performing route guidance.

2. Description of the Prior Art

In prior known land vehicle navigation apparatus, where a route to a destination is determined based on input of several locations, including pass-through points and destination, and route guidance is performed using display screens and/or electronically synthesized voice messages based on the determined guidance route, route guidance using intersection diagrams is provided for each guidance intersection. In the route guidance using maps, the present position of the vehicle is displayed at the center of a map of the immediate vicinity, along with associated landmarks located along the road. As shown in FIG. 10, a guidance route (fat broken line) and a present position mark (a combination of a broken-line circle and a triangle) are overlaid for display on the map; however, when the present position is approaching a guidance intersection which is a predefined distance ahead (300 m, for example), an intersection (close up) diagram which visually depicts details of the intersection is displayed on the screen with enlarged details including associated points or "landmarks," which points may be used to visually recognize and confirm the intersection, e.g. a gas station (GS), convenience store, bank, public facility and the like, as shown in FIG. 11.

However, where an intersection diagram is displayed, since all roads connecting at that intersection are indiscriminately displayed, as shown in FIG. 11, the resulting display screen becomes complicated reducing the readability of the screen, i.e. impeding rapid recognition of the proper route and travel direction.

SUMMARY OF THE INVENTION

It is therefore an object of the present invention to provide an improved vehicle navigation system capable of avoiding the aforementioned problems of the prior art.

It is another object of the invention to provide an improved land vehicle navigation system enabling a travel path at a guidance intersection to be easily recognized by improving readability of displayed intersection diagrams.

To attain the foregoing objects the present invention provides a vehicle navigation apparatus for providing guidance to a destination along a route predetermined by a route search, while tracking the present position, and for providing display/guidance at intersections with use of detailed drawings of the intersections, with information other than that truly necessary for guidance not being displayed, i.e. by limiting the roads illustrated on the display, or with less prominent display of details unrelated to the guidance.

In accordance with another aspect of the invention, a vehicle navigation apparatus is provided which includes a storage device for storage of map data for a route to a destination and route guidance data, an intersection drawing visualizer or "drafter" for drafting or illustrating, as an intersection, drawing details of the area near the intersection as determined to be needed for guidance, based on the data stored in the storage device, and a controller for limiting the information included in an intersection drawing to that truly necessary for guidance. Thus, the controller imposes a limitation on the information to be included by the intersection drawing visualizer.

The controller displays an intersection diagram responsive to receipt of an intersection diagram display instruction. The controller determines whether or not preset criteria are satisfied, and imposes a limitation on information failing to satisfy the criteria. Thus, the controller adds a limitation to information being drawn by determining whether it is a road connected to a guidance intersection, whether it is a road connected to the predetermined route (under guidance), and whether it is a passable road. The controller limits illustration of features failing the above-described criteria by displaying such features less prominently, e.g. in the same color as the background color, or by omitting their illustration entirely.

The apparatus is also provided with a present position detector for detecting the present vehicle position while the controller displays an intersection diagram in response to receipt of an intersection display instruction signal, provided the detected present vehicle position is a predetermined distance from the approaching guidance intersection of concern.

These and other objects, features and advantages of the invention will become apparent from the following description of preferred embodiments of the invention, as illustrated in the accompanying drawings.

BRIEF DESCRIPTION OF THE DRAWINGS

FIGS. 2A–2E, 3A–3B and 4A–4B are diagrams showing structures of several data files as employed in the navigation apparatus of FIG. 1;

FIG. 5 is a flowchart of the main routine for operation of the vehicle navigation apparatus of FIG. 1;

DETAILED DESCRIPTION OF THE INVENTION

Figure 1:
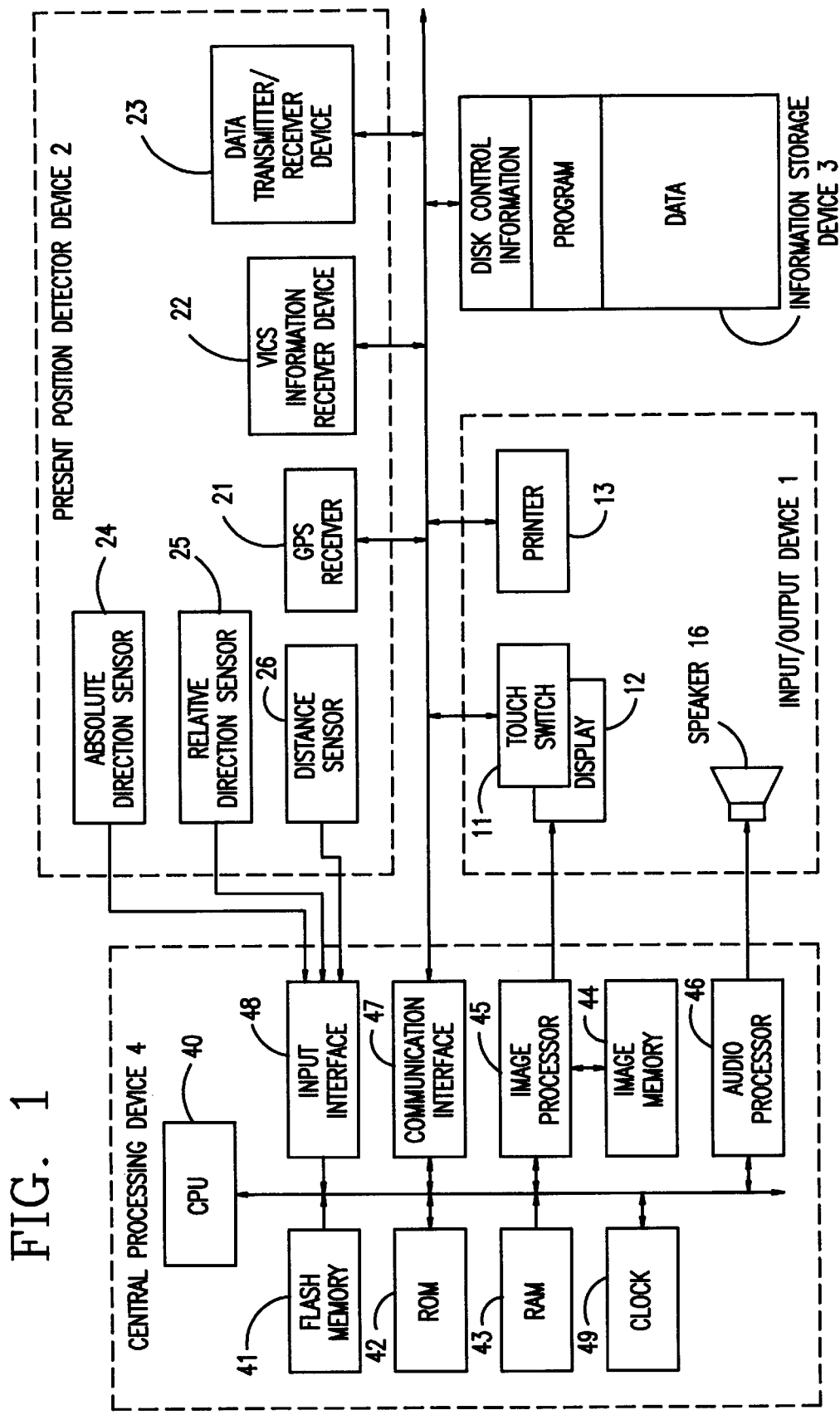
FIG. 1 is a block diagram of a land vehicle navigation apparatus in accordance with one embodiment of the invention.

Referring now to FIG. 1, a land vehicle navigation apparatus in accordance with one preferred embodiment of the invention is shown as including an input/output (I/O) device 1, a present position detector 2, an information storage unit 3 and a central processing unit 4. The I/O device 1 provides for inputting and outputting information pertaining to route guidance. The present position detector 2 detects information concerning the present position of the vehicle. The storage unit 3 stores data items including, but not limited to, navigation data as required for route calculations and display of guidance. The central processor 4 executes display/audio guidance routines required for route search and route guidance and also provides control over the entire system.

The I/O device 1 functions to instruct the central processor 4 with regard to navigation operations in conformity with the vehicle operator's intention and with regard to output of processed data, thereby permitting input of a target place or destination while enabling guidance information to be output via voice messages and/or display screens, as required by the operator. As a means for providing such functions, its input section has a touch sensitive panel 11 and operation switches for input of a destination based on the telephone number or map coordinates thereof, as well as for request of route guidance. Obviously, this may alternatively be in the form of other functionally equivalent input devices, including a remote controller. An output section includes a display unit 12 which visually indicates input data and also automatically displays on its screen route guidance as graphics images upon reception of a request from a vehicle operator (driver), a printer 13 which produces hard copies of data as processed by the central processor 4 and of data stored in the information storage unit 3, and a speaker 16 for audibly outputting route voice guidance.

A voice recognition device may be added for enabling voice input and a record card reader for reading data recorded in IC cards or magnetic cards. There may also be added a data communication device for data communication between the navigation apparatus and remote information sources, such as an information center, for storing data necessary for navigation and providing information via communication links, upon the vehicle operator's request, or an electronic personal information management tool pre-storing the operator's specific data, such as map data, destination data and the like.

The display unit 12 may be a color cathode ray tube (CRT) monitor or color liquid crystal display (LCD) panel, for color display of all the screens necessary for navigation, including a route setting screen, route segment drawing screen, traffic intersection drawing screen and the like, based on map data and guidance data processed by the central processor 4, and also for displaying current screen buttons for use in operations such as for setting route guidance and changing guidance and screens during route guidance. In particular, pass-through intersection information such as the name or title of an intersection to be passed through will be color-displayed on the road-segment drawing screen in a pop-up manner at any time as necessary.

The display unit 12 is provided within an instrumental panel near the driver's seat, thus enabling the driver by himself to confirm the present location of his or her vehicle by viewing a road-segment drawing, while acquiring therefrom information as to the route ahead. The display unit 12 comes with the touch panel 11 corresponding to the display of function buttons, and is thus arranged so that the aforesaid operations are effected responsive to signals input by touch of an appropriate button. An input signal generator, including such buttons, the touch switch or the like constitutes the input section.

The present position detector 2 includes a global positioning system (GPS) receiver 21 for acquiring information by utilizing the present vehicle position satellite GPS architecture. A vehicle information communications system (VICS) information receiver 22 is provided for acquiring information from FM multiple broadcasts, radio wave beacons, optical beacons and other such sources. A data transmitter/receiver 23 is connected for bidirectionally communicating—by use of a mobile telephone set, personal computer, or the like—information with the information center (ATIS, for example) and with other vehicles. An absolute direction sensor 24 detects the absolute travelling direction of the vehicle using, for example, geomagnetism. A relative direction sensor 25 detects the vehicle's relative travelling direction by use of, for example, a steering sensor or gyro sensor. A distance sensor 26 detects the travelled distance of the vehicle from the number of rotations of, for example, a shaft. The present position detector 2 operates to transmit and/or receive road information and traffic information pertinent to the vehicle's travel and to detect information as to the present vehicle position and further to transmit/receive information as to the present position.

The storage unit 3 is an external storage device which stores therein programs and data for navigation, and may be a compact disc read-only memory (CD-ROM) in this embodiment. The programs are comprised of an operating system (OS) section and an application section. The application section may include a map drawing section, a route search section, a route guidance section, a present position calculator section, a destination setting operation control section and others. Also stored in unit 3 are a program for execution of routines such as route searching, a program for display output control necessary for route guidance and voice output control required for voice guidance, as well as data necessary therefor, and display information data necessary for route guidance and map display. The data may include all the stored data items required for the navigation apparatus, and may consist of several data files including map data necessary for route guidance (road map, house map, building shape map, etc.), traffic intersection data, node data, road data, photograph data, registered point data, destination point data, guidance road data, detailed destination data, destination name data, phone number data, address data and other data.

The central processor 4 includes a CPU 40 such as a microprocessor which performs a variety of arithmetic operations. Processor 4 also includes several memory devices: a "flash" electrically erasable programmable read-only memory (EEPROM) for reading programs out of the CD-ROM of the storage unit 3 and storing the same therein; a ROM 42 for storage of a program for executing program-check and update operations of the flash memory 41 (program loader); a random access memory (RAM) 43 for temporarily storing therein searched route guidance information such as the point coordinates of a destination presently set, road name code number and the like, along with data subject to current arithmetic processing; and, an image memory 44 such as a video RAM (VRAM) for storage of image data to be used for screen display. An image processor 45 retrieves image data from the VRAM 44 on the basis of a display output control signal from the CPU 40 and processes the retrieved image data for output to the display. An audio processor 46 is provided which is responsive to receipt of an audio output control signal from the CPU for synthesizing an audible voice, phrase, sentence with a single message, sound or the like, i.e. it produces a synthesized signal and converts that synthesized signal into an analog signal, which is output to the speaker 16. A communication interface 47 allows transfer of I/O data over communication channels. A sensor input interface 48 receives sensor signals from the present position detector 2. A clock 49 serves to write date and time into internal dialog information. In the central processor 4, when data acquired by each sensor of the present position detector 2 is received through the sensor input interface 48, the CPU 40 operates on the received data to calculate the coordinates of the present vehicle position at constant time intervals and to write it into RAM 43 temporarily. The present position coordinates are obtained as a result of a map-matching routine to allow for detection of errors in several data items. Also, output values of each sensor are always subject to correction. Here, the route guidance is arranged to enable the driver to select the screen display and/or voice output.

Figure 2:
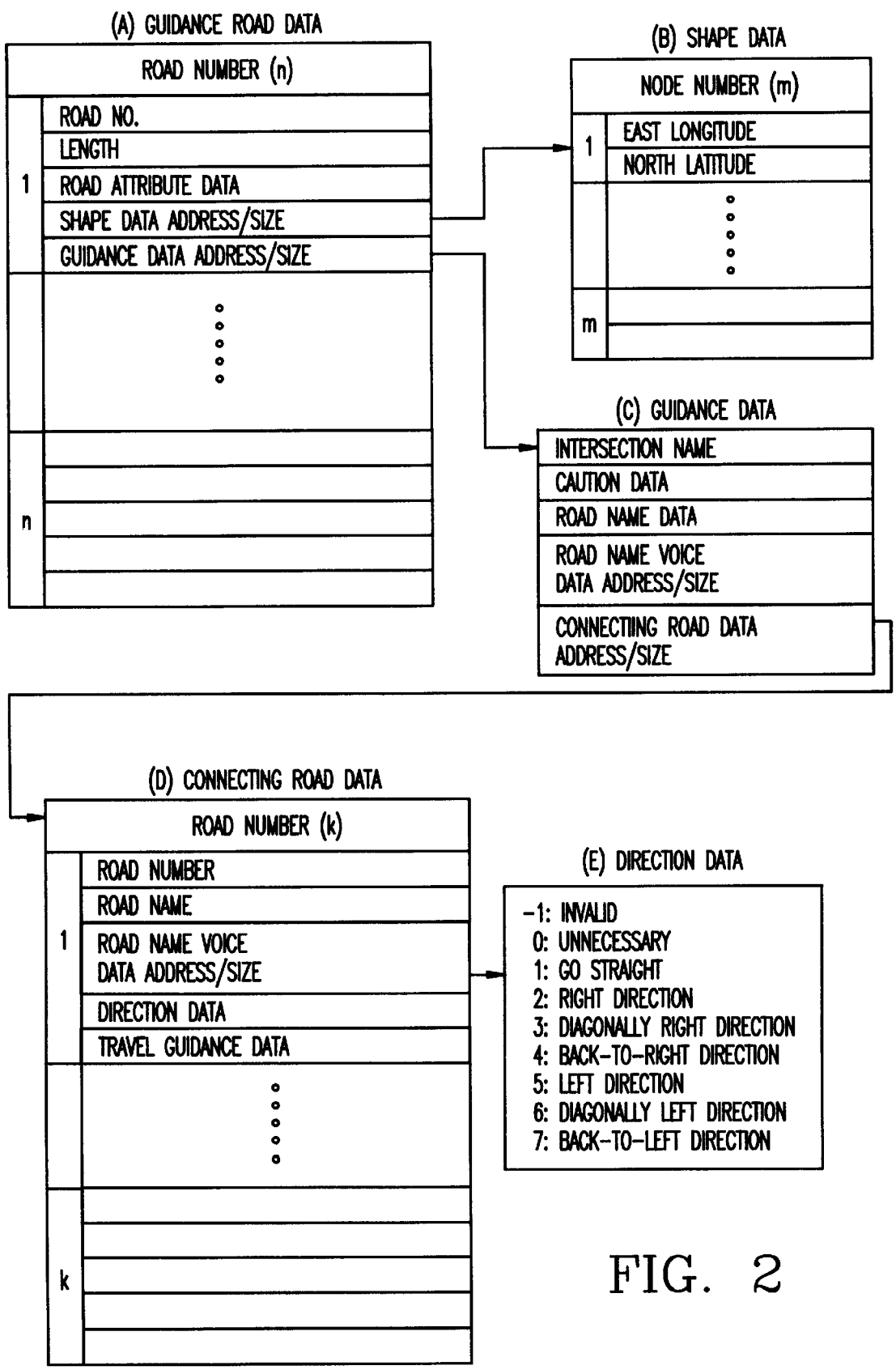

FIGS. 2A through 4B show exemplary main data files as stored in the information storage device, wherein a guidance road data file may consist of—for each of the roads of number n—a road number, road segment length, road attribute data, shape data address/size, and guidance data address/size as shown in FIG. 2A, which are obtained by a route search and stored as the data necessary for execution of route guidance.

The road number is set independently of the direction (outward bound or return) with respect to each road between adjacent branch points. The road attribute data is road guidance assisting information data which may include, for example as shown in FIG. 3A, indication of an elevated or subway road and lane number information. Thus, such data items may be representative of whether a road of interest is an elevated track, beside an elevated track, subway line, or beside a subway line. As shown in FIG. 2B, the shape data is in the form of coordinate data items which consist of east longitude and north latitude values with respect to each of plural nodes of number m which divide a road into a plurality of segments. As shown in FIG. 2C, the guidance data may consist of an intersection (or branch point) name, caution data, road name data, the address and size of road name, pronunciation data, and the address and size of course data.

Figures 4A, 4B, 5:
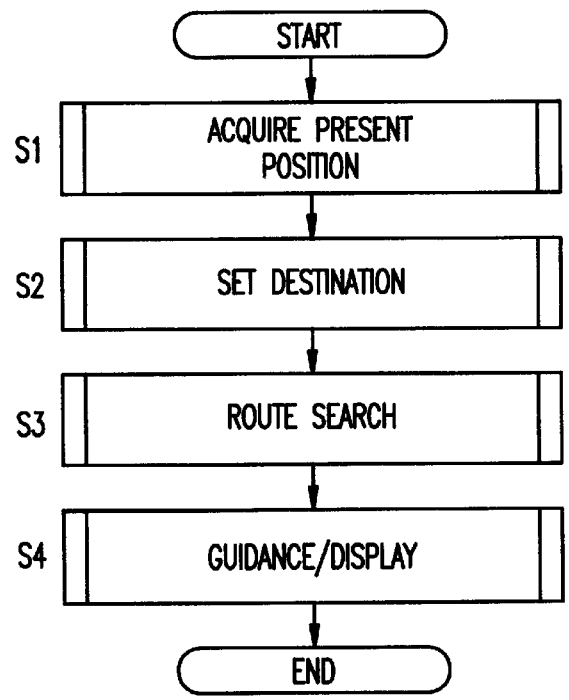

As shown in FIG. 4A, the caution data is data which indicates, for example, a railroad crossing, a tunnel entrance, a tunnel exit, point of lane width reduction, which data is processed to alert the driver to be cautious at such points. As shown in FIG. 3B, the road name data indicates the road type such as a highway, city road, toll road, or ordinary public road (national road, state or prefecture road) and information showing whether a road of interest is the main lane or access lane with respect to the highway, city road or toll road. The road name data may consist of data indicative of road type and further include a subtype number indicative of the individual roads within each road type. As shown in FIG. 2D, the connecting road data may consist of a road number, road name, the address and size of road name voice data, road direction data, and travel guidance data.

As shown in FIG. 2E, the course direction data is indicative of several information items including invalidity (no use of course direction data), unnecessary (no guidance), go-straight, right turn, diagonally right direction, back-to-the-right direction, left direction, diagonally left direction, and back-to-the-left direction. As shown in FIG. 4B, the travel guidance data may include data items for use in providing guidance as to which lane is used for travel in cases where a plurality of lanes are provided, and indicate information as to whether the vehicle is traveling near-the-right, near-the-left or near-the-center of the road, or on a road with no center line.

The main routine for operation of the navigation apparatus is shown in FIG. 5. As shown, when the program for operation of the route guidance system is started under control of the CPU 51 of central processor 4, the present position detector 2 first detects the present vehicle position and displays a map of the vicinity with the detected present position being at the center thereof, while at the same time displaying the name of the present position (step S1). Then, a destination is input by use of a phone number, administrative address, facility name, registered point or the like (step S2). Next, a search for a route from the present position to the destination (step S3) is conducted. Once the route is determined, route guidance and display will be recurrently provided until the vehicle actually arrives at the destination, while detector 2 tracks the present position loci (step S4). Where an input of a temporary stop, prior to the destination, is input, a search area is set for performing a search again upon entry into the search area, whereby similar route guidance is iteratively provided until the vehicle's arrival at the destination.

Figure 6:
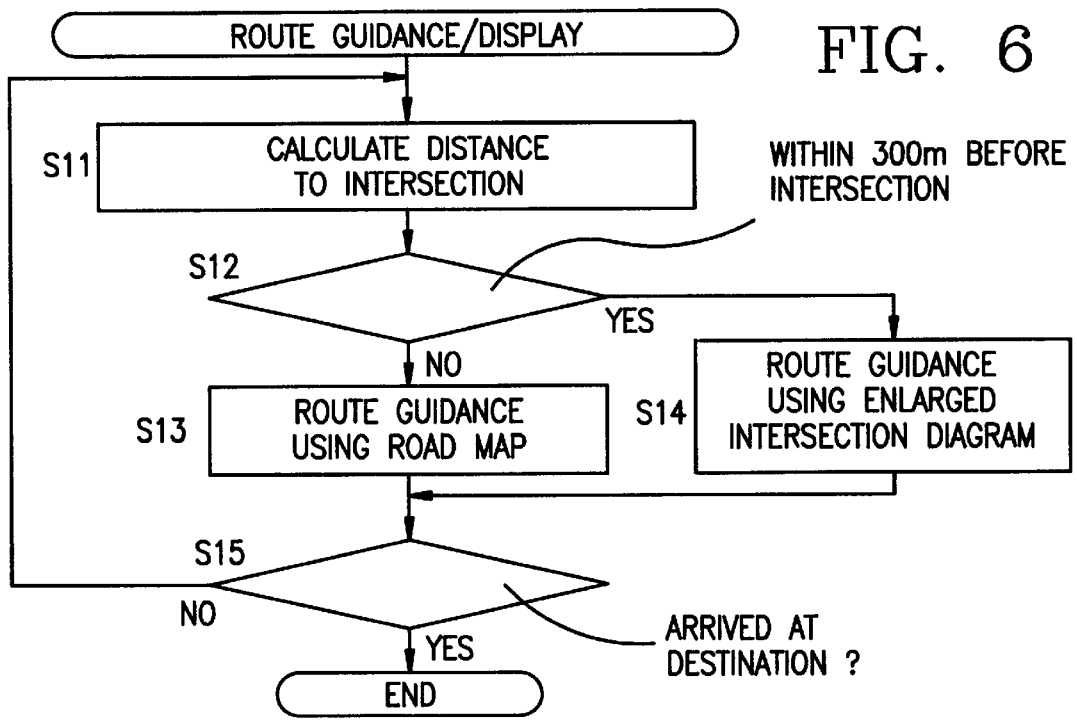
FIG. 6 is a flowchart of a route guidance/display subroutine executed as step S4 of the main routine of FIG. 5.

As shown in FIG. 6, the distance from the present position to a "guidance intersection" (understood to include traffic circles and branch points) is calculated (step S11) and then a judgement is made as to whether or not the distance to the guidance intersection is within a range, for example, of 300 meters (step S12). If the distance to the guidance intersection is not within 300 meters then a road map of the immediate surrounding area (vicinity) is displayed with the present vehicle position being as its center, along with display of some characteristic objects (landmarks) located along the road, and the guidance route is shown as a fat broken line with the present position mark (a combination of a broken-line circuit and a triangle) overlaid thereon (step S13). On the other hand, if the distance to the guidance intersection is within 300 meters, then an intersection diagram is displayed with only information as to certain roads, characteristic objects and other items of information which are necessary for route guidance (step S14). These routines are repeated until the vehicle reaches the destination (step S15).

Figure 7:
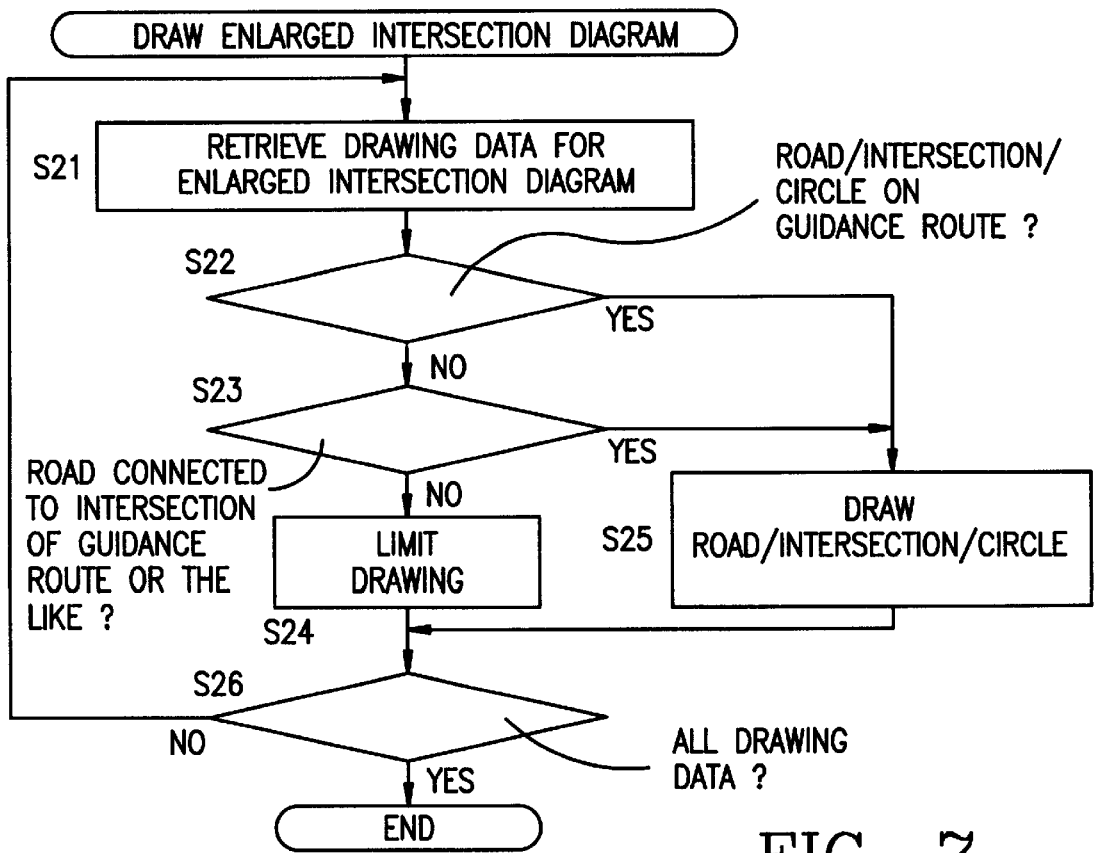
FIG. 7 is a flowchart of an enlarged intersection drawing subroutine executed as step S14 of the routine of FIG. 6.

The intersection diagram drawing routine is as shown in FIG. 7. Drawing data for the intersection diagram is retrieved from a given address on a storage medium, e.g. a CD-ROM, and read into RAM 43 (step S21). Judgement is made as to whether the retrieved drawing data stored in RAM 43 is for a road segment constituting part of the guidance route or traffic circle on the guidance route (step S22) and as to whether or not it is for a road connected to an intersection along the guidance route (step S23). In the case where neither of these criteria are met (no positive judgment) the data is rejected for use in drawing the intersection or circle diagram (step S24); if either one of the judgments is successful then the road, intersection or traffic circle is drawn by image processor 45 (step S25). The foregoing process will be recurrently executed with respect to all the drawing data (step S26).

Figure 8A:
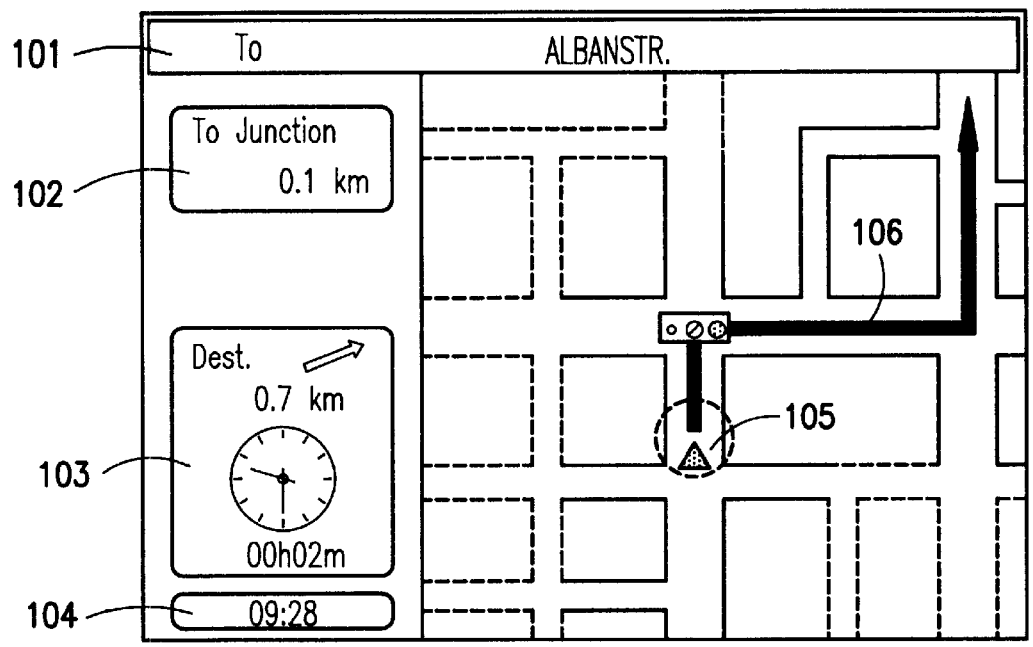
FIGS. 8A–8B are diagrams showing examples of intersection displays generated by the apparatus of FIG. 1.
Figure 8B:
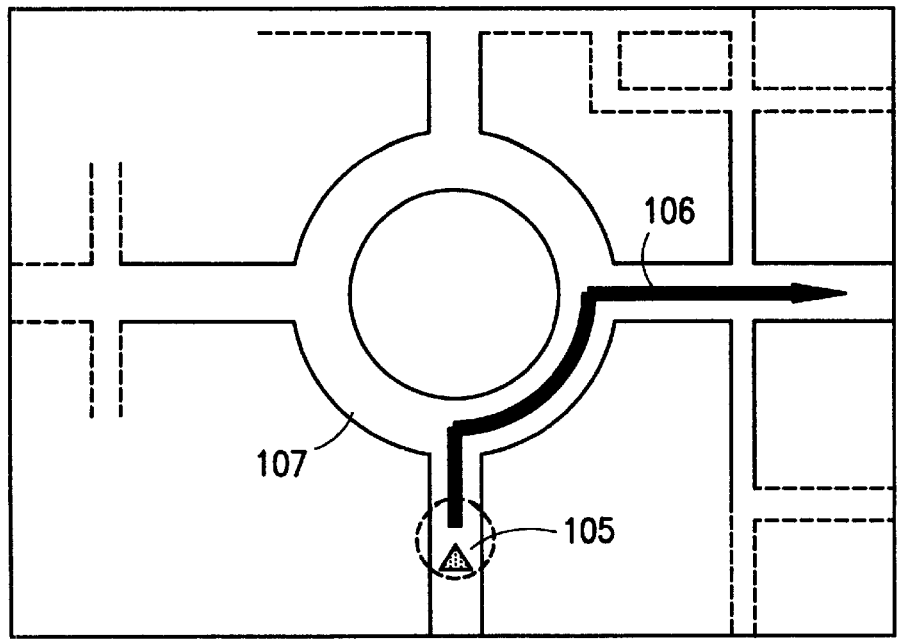

Upon execution of the above-described process the intersection diagram, as in FIGS. 8A and 8B, will show the guidance intersection, circle, roads and characteristic objects in addition to the guidance route, connected to the intersection being passed through, whereas intersections and roads coupled thereto, as designated by elongate broken lines, are limited in illustration. This illustration limitation may be attained, for example, by erasing from the intersection diagram such roads and intersections which are unnecessary for the route guidance, i.e. by eliminating all illustration of them entirely, or, alternatively, virtually erasing from the intersection diagram such unnecessary roads and intersections by drawing them using the same color as a background color. In other words, only that subset of image data specific to the approaching intersection is screened for compliance with one or more criteria and the image processor 45 prominently displays only those features of the intersection for which data of the subset are deemed in compliance.

Other features are either omitted entirely (erased) or blended into the background.

It should be noted in FIG. 8A that the name of a new street to be travelled from the guidance intersection—"To ALBANSTR."— is displayed in an area 101; distance to the guidance intersection "To Junction 0.1 km" is displayed in an area 102; the destination's direction "→" and remainder distance "0.7 km," as well as an expected arrival time at the destination (indicated by an analog clock), and travel time to the destination "00h02m" are displayed in an area 103; and, the current time "09:28" is displayed in an area 104. The numeral 105 designates a present vehicle position mark, and 106 is the guidance route. In the case of a traffic circle, as shown in FIG. 8B, all the roads connected to the circle 107 are illustrated. In this way, since only roads directly connected to the guidance route are displayed in the intersection diagram, while erasing from the intersection diagram certain roads that are not directly connected to the guidance route and are off of the guidance route, recognition of the guidance route with reference to the guidance intersection diagram is enhanced to ensure that the vehicle will be able to turn at the guidance intersection without mistake.

Figure 9:
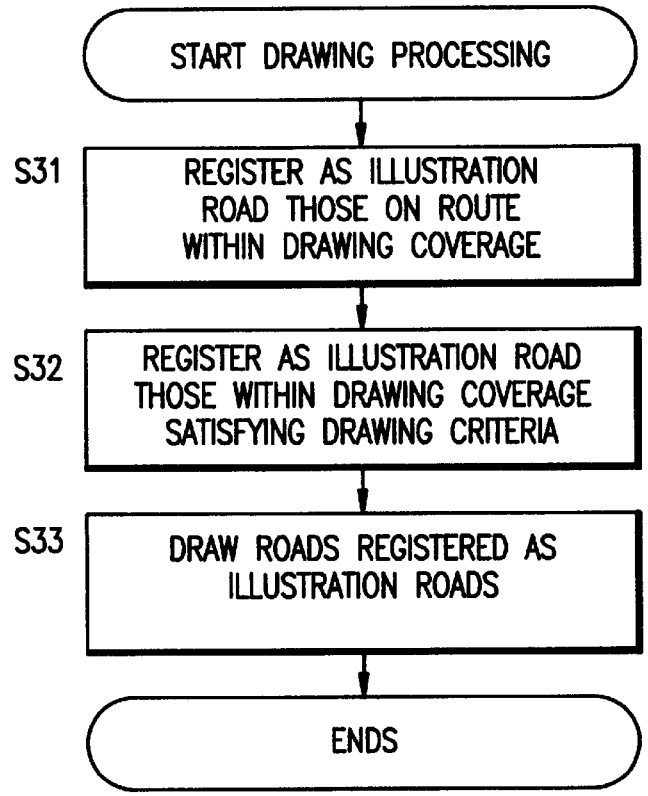
FIG. 9 is a flowchart of another intersection drawing subroutine which may be used in the navigation apparatus shown in FIG. 1.
Figure 10:
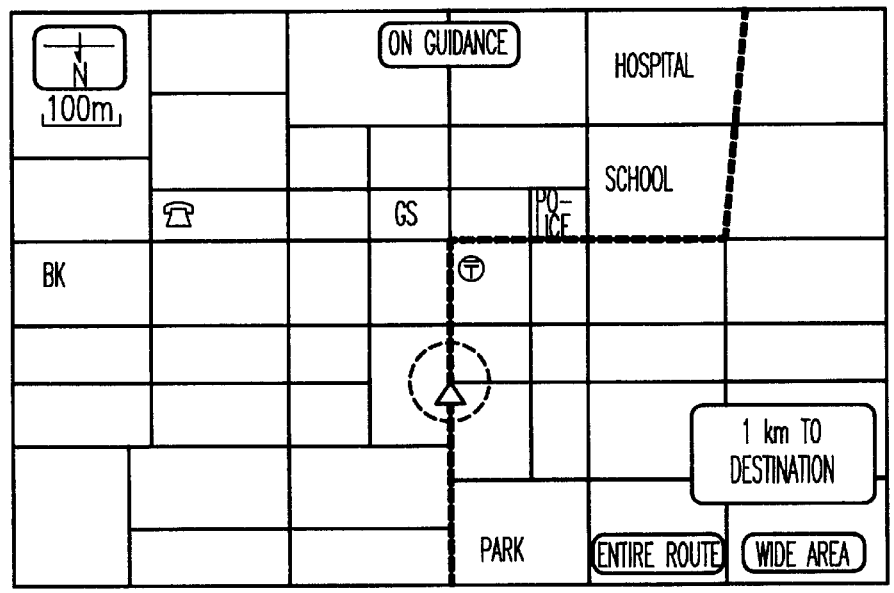
FIGS. 10–11 show typical route guidance displays of the prior art.
Figure 11:
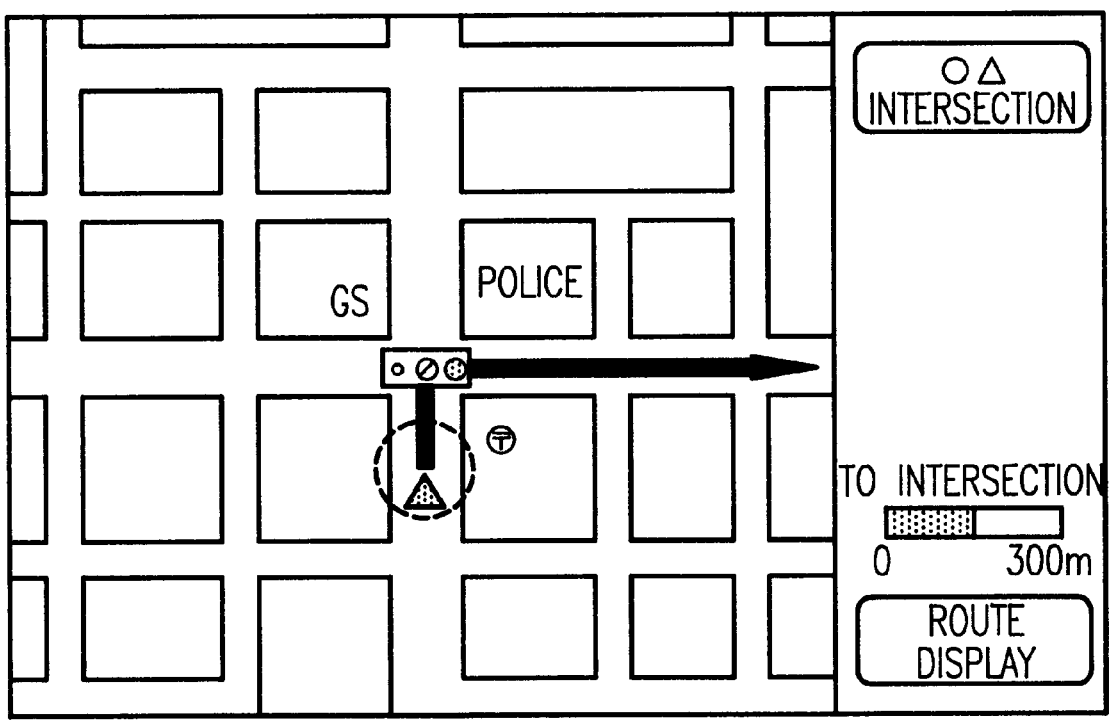

FIG. 9 illustrates another example of intersection diagram drawing. In the intersection diagram drawing method shown in FIG. 9, at the start of the drawing process roads along the route within the drawing coverage and to be illustrated are registered as illustration roads (step S31); next, those roads within the drawing coverage which are out of the route and yet satisfy the drawing criteria are registered as illustration roads (step S32). The criteria for illustration roads (roads to be drawn at this time) are as follows: i) they connect to the guidance intersection, ii) they connect to the predetermined route ("guidance route"), iii) they are passable roads (for example, one-way roads to which entry is prohibited and any other entry-impermissible roads identified as such from the traffic information received from VICS or the like are treated as non-passable roads and thus can not be "illustration roads") or equivalents thereto. Then the intersection diagram is illustrated showing only those road segments that were registered as illustration roads in the steps S31 and S32 (step S33).

The intersection diagram drawing or "draft" processing as explained in connection with FIGS. 7 and 9 may be carried out during the route guidance using the intersection diagram in step S14 in the route guidance/display routine as explained with reference to FIG. 6; however, in cases where the drafting is incapable of being performed at high speed, the intersection diagram drafting may be executed in advance and stored in the VRAM allowing the diagram to be more quickly displayed when the vehicle is a predetermined distance from the subject intersection. These programs may be prestored in the above-mentioned CD-ROM and then loaded into the flash memory. Alternatively, in order to reduce the aforesaid intersection diagram drafting, intersection diagram data in conformity with route guidance with respect to each intersection may be stored in advance. Furthermore, while the to-be-drafted information is limited in accordance with the previously mentioned criteria during the process of displaying of an intersection diagram, alternatively such information may be prestored. In this case, a set of to-be-drafted information can be stored for each intersection-approaching path.

As noted above, the intersection drawing "draft" processing may be performed in advance. By way of example, where the drafting is executed when the vehicle comes to within 500 or 600 meters of an intersection, it is possible to immediately change to an intersection diagram when the vehicle is 300 meters from such intersection. Since the time for start of such processing is determinable in accordance with the time required therefor, the drafting may be started when the vehicle arrives at a location a specified distance from the intersection as mentioned supra. Alternatively, the starting time for intersection drafting may be determined based on the vehicle speed while retaining a sufficient time cushion to "absorb" a time lag due to the changing of display of such intersection diagram. In yet another alternative, several processing start-up timing determination methods are provided to enable selection of an appropriate one in accordance with the area, such as a city or town where much of such information must be processed. Obviously, the system may be arranged so that when the vehicle turns at an intersection, the intersection drawing draft processing relating to the next guidance intersection is started to permit appropriate display in conformity with the driver's requests.

However, the present invention should not be limited to the aforesaid embodiment. For example, in the above embodiment, an intersection diagram is displayed automatically only when the present position is within a predefined distance from the guidance intersection; however, the intersection diagram may alternatively be displayed responsive to an intersection enlargement instruction of a switch or the like. Further, although only the intersections along the guidance route, circle, and roads connected thereto are illustrated, with the remaining roads being either eliminated from illustration or depicted in the same color as the background color, alternatively, the draft processing may employ display schemes using quiet colors such as those close to the background color, certain quiet colors that are different from those used for the guidance intersection, circles and roads connected thereto, broken lines, or the like. Furthermore, the information necessary for route guidance may be limited to only passable roads, excluding the do-not-enter roads and to roads of a width greater than a specified lane width, after comparison and judgment of road width values.

As apparent from the above, according to the present invention, an intersection diagram is displayed when a vehicle is at specific location in advance of a guidance intersection with a specified distance therebetween, and the display of the intersection diagram is limited to those roads and information decided to be necessary for route guidance, while roads and information judged to be unnecessary for the route guidance are eliminated from the displayed image on the guidance screen. Thus, the intersection diagram is displayed in a simplified and concise way. Accordingly, it is possible to improve the readability and understanding of the intersection diagram, providing easy and accurate recognition of the travel path (travel direction) at the intersection. Furthermore, depicting and displaying only information necessary for route guidance as the intersection diagram may serve to reduce the load on the system for execution of the display routine and/or reduce the time of the load on the system for execution of the display routine and/or reduce the time required to generate such display.

The entire disclosure of Japanese Patent Applications No. 8-230301 and No. 8-230302, filed on Aug. 30, 1996, including their specifications, claims, drawings and summaries are incorporated herein by reference in their entirety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A storage medium containing a program for providing guidance along a route to a destination, said program comprising the steps of:

retrieving intersection information, including guidance and road information for a guidance intersection, from storage on the basis of stored route information;

judging whether or not the retrieved road information satisfies at least one predetermined criterion;

limiting the retrieved road information to road information judged to satisfy the one predetermined criterion;

outputting road information limited to that judged to satisfy the one predetermined criterion; and drawing an image of the guidance intersection according to the output road information.

2. A method for providing guidance along a route to a destination comprising:

retrieving intersection information, including guidance and road information for a guidance intersection, from storage on the basis of stored route information;

judging whether or not the retrieved road information satisfies at least one predetermined criterion;

limiting the retrieved road information to road information judged to satisfy the one predetermined criterion;

outputting road information limited to that judged to satisfy the one predetermined criterion; and drawing an image of the guidance intersection according to the output road information.

3. A vehicle navigation apparatus for providing guidance along a route to a destination, said vehicle navigation apparatus comprising:

map information storage means for storing map information including road information and intersection information;

route storage means for temporarily storing route information pertaining to the route to the destination;

read means for retrieving map information limited to a single guidance intersection, from said map information storage means, based on the stored route information, into said route storage means;

control means for judging whether or not the limited map information temporarily stored in said route storage means satisfies at least one predetermined criterion, and for further limiting the retrieved map information in accordance with the judgement; and intersection image generator means for drawing an intersection image of the guidance intersection based on the further limited map information.

4. The vehicle navigation apparatus of claim 3 wherein said one criterion relates to data for roads included within the map information and requires that the data be for a road included within the route or directly connected to the route.

5. The vehicle navigation apparatus of claim 3, wherein said route storage means is a random access memory and further comprising read means for reading map information specific to the guidance intersection from said map information storage means into said random access memory and wherein said control means judges the specific map information stored in said random access memory.

6. The vehicle navigation system of claim 3 wherein said intersection image generator means draws only the limited map information.

7. The vehicle navigation apparatus of claim 3 further comprising:

present location detecting means for detecting a present location of a vehicle; and wherein said intersection image generator means draws the intersection image when the vehicle reaches a predetermined distance from the guidance intersection.

8. The vehicle navigation apparatus of claim 3 wherein said control means permits displaying of an intersection corresponding to instruction signal for drawing.

9. The vehicle navigation apparatus of claim 3 wherein said one criterion relates to data for roads included within the map information and requires that the data be for a road which is currently passable.

10. The vehicle navigation apparatus of claim 9 wherein said intersection drawing generator means drafts the features for which data does not satisfy said one criterion in the same color as a background color, with features for which data does satisfy said one criterion being prominently displayed in a color other than said background color.

11. The vehicle navigation apparatus of claim 3 wherein said control means judges whether or not road information included within the retrieved map information satisfies said one criterion.

12. The vehicle navigation apparatus of claim 11 wherein said one criterion is connection of a road, to which the included road information relates, to the guidance intersection.

13. The vehicle navigation apparatus of claim 11 wherein said one criterion is prohibition against entry from the guidance intersection onto a road to which the included road information relates.

* * * * *